Nov. 18, 1958 — J. MORLEY ET AL — 2,860,654
FUEL SYSTEM HEAD CONTROL UNIT
Filed Feb. 15, 1956 — 4 Sheets-Sheet 2

JOHN MORLEY
JOHN KARANIK
ALEXANDER P. MOORE
INVENTORS

BY Lyon & Lyon
ATTORNEYS

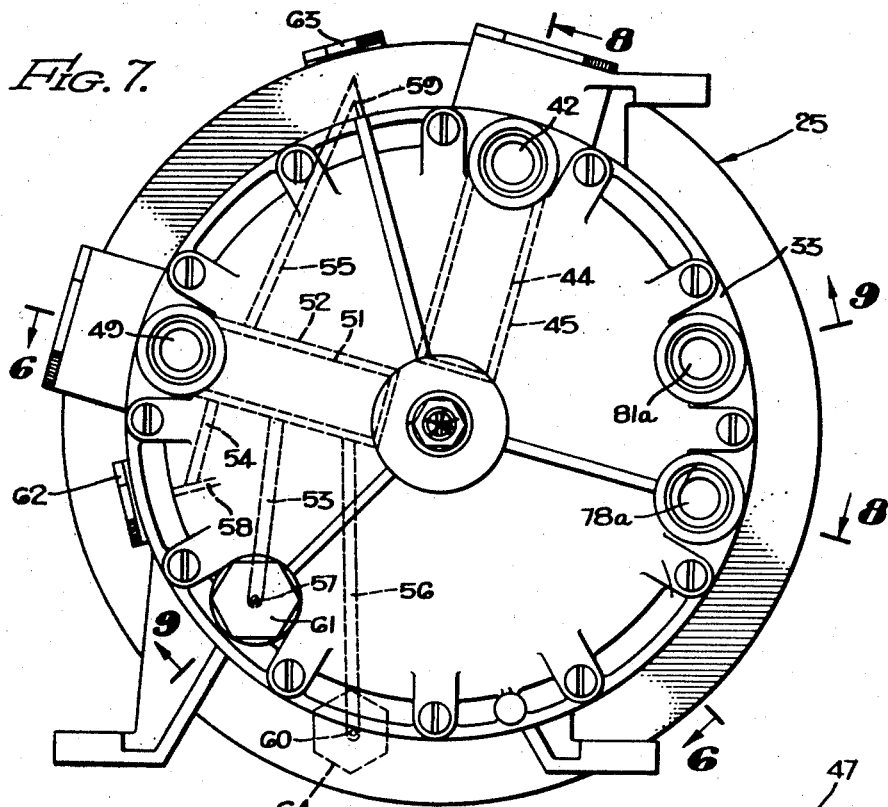
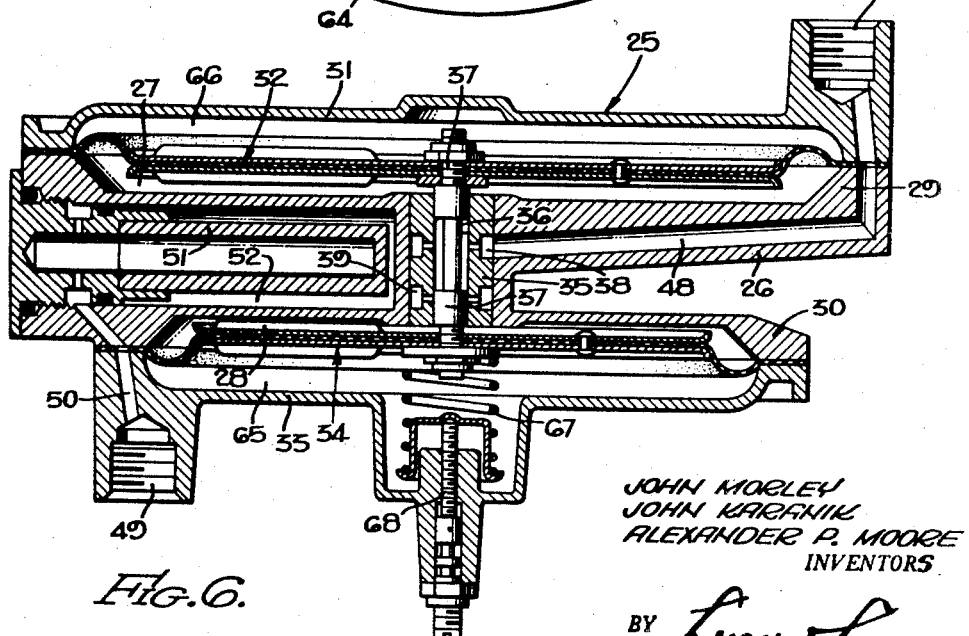

JOHN MORLEY
JOHN KARANIK
ALEXANDER P. MOORE
INVENTORS

BY Lyon & Lyon
ATTORNEYS

United States Patent Office 2,860,654
Patented Nov. 18, 1958

2,860,654

FUEL SYSTEM HEAD CONTROL UNIT

John Morley, Huntington, John Karanik, Hempstead, and Alexander P. Moore, Bethpage, N. Y., assignors to Parker-Hannifin Corporation, Cleveland, Ohio, a corporation of Ohio Application February 15, 1956, Serial No. 565,700

4 Claims. (Cl. 137—98)

This invention relates to apparatus for controlling the emptying of liquid from a pair of tanks and is particularly directed to apparatus for controlling the relative rates of flow from aircraft fuel tanks to minimize change in location of the center of gravity of the aircraft. In accordance with this invention, the hydraulic head of liquid remaining in the tanks as they empty is maintained in a predetermined relationship, regardless of changes in attitude of the aircraft.

This invention relates to improvements over the devices disclosed in the co-pending applications of Davies, Serial No. 483,646, Badger, Serial No. 483,647, and Taylor, et al., Serial No. 483,662, all filed January 24, 1955. The disclosures of these co-pending applications relate to apparatus for maintaining predetermined relationships in the hydraulic heads of liquid within a pair of aircraft fuel tanks, wherein sensing lines are connected from each tank to a differential pressure device, the latter device serving to operate a modulating valve which regulates the discharge of fuel from one of the tanks.

One feature of the present invention relates to locating the lower sensing line for each tank at a position directly below the mean centroid of the fuel mass when the tank is filled. The basic purpose is to control the relative weights of fuel in the two tanks to minimize shifting of the center of gravity of the aircraft as fuel is drawn from the tanks. The device of the present invention utilizes the hydraulic head in each tank as a measure of the weight of the fuel therein. Accordingly, it is important to have a minimum change in the sensed head pressure as the tank assumes various attitudes. For example, if the head control system were designed to discharge fuel from two different tanks at a predetermined relative rate with the aircraft in level flight attitude, it is evident that a change in attitude will give a different hydraulic head reading even though the tank still contained the same mass of fuel. The new head reading would not have the same correlation to the fuel mass within the tank and would cause a change in the rate of discharge from one of the tanks and change the relative rate at which the two tanks were emptying. If the non-level attitude of the aircraft were maintained for considerable time, more fuel would be discharged from one of the tanks than would occur at the level attitude and the weight distribution might be such as to seriously disturb the location of the center of gravity of the aircraft. This undesirable effect is minimized by placing the tank bottom sensing connection directly below the centroid of the fuel mass in a full tank.

Another feature of the present invention lies in the provision of restricted orifices at the connection of the sensing lines to the lower portions of the fuel tanks for limiting the amount of air flow through the sensing lines and orifices into the tanks, thereby effectively preventing fuel from entering these lines in a direction opposite to that of the direction of air flow. The use of these restricted orifices makes it possible to materially reduce the flow rate of air required in the sensing lines, and thereby insures that the sensing lines remain purged of fuel, regardless of various flight attitudes of the aircraft.

Another feature of the present invention is to provide connections permitting the use of air from the top of the aft tank to operate the modulating valve through which the contents of that tank are discharged.

A further feature of the present invention lies in the provision of a novel form of pressure differential device for operating the modulating valve. This device may include a pair of pressure receiving diaphragms, one associated with each tank. When it is desired that one of the tanks empty at a predetermined fixed ratio with respect to the emptying of the other tank, the diaphragm associated with the low-head tank is constructed with an effective area proportionately larger than the effective area of the diaphragm associated with the high-head tank.

Other and more detailed objects and advantages will appear hereinafter.

In the drawings:

Figure 6 is a cross-section view of the differential pressure control device, the view being taken substantially along lines 6—6 of Figure 7.

Figure 7 is a bottom view of the control device.

Figure 1:
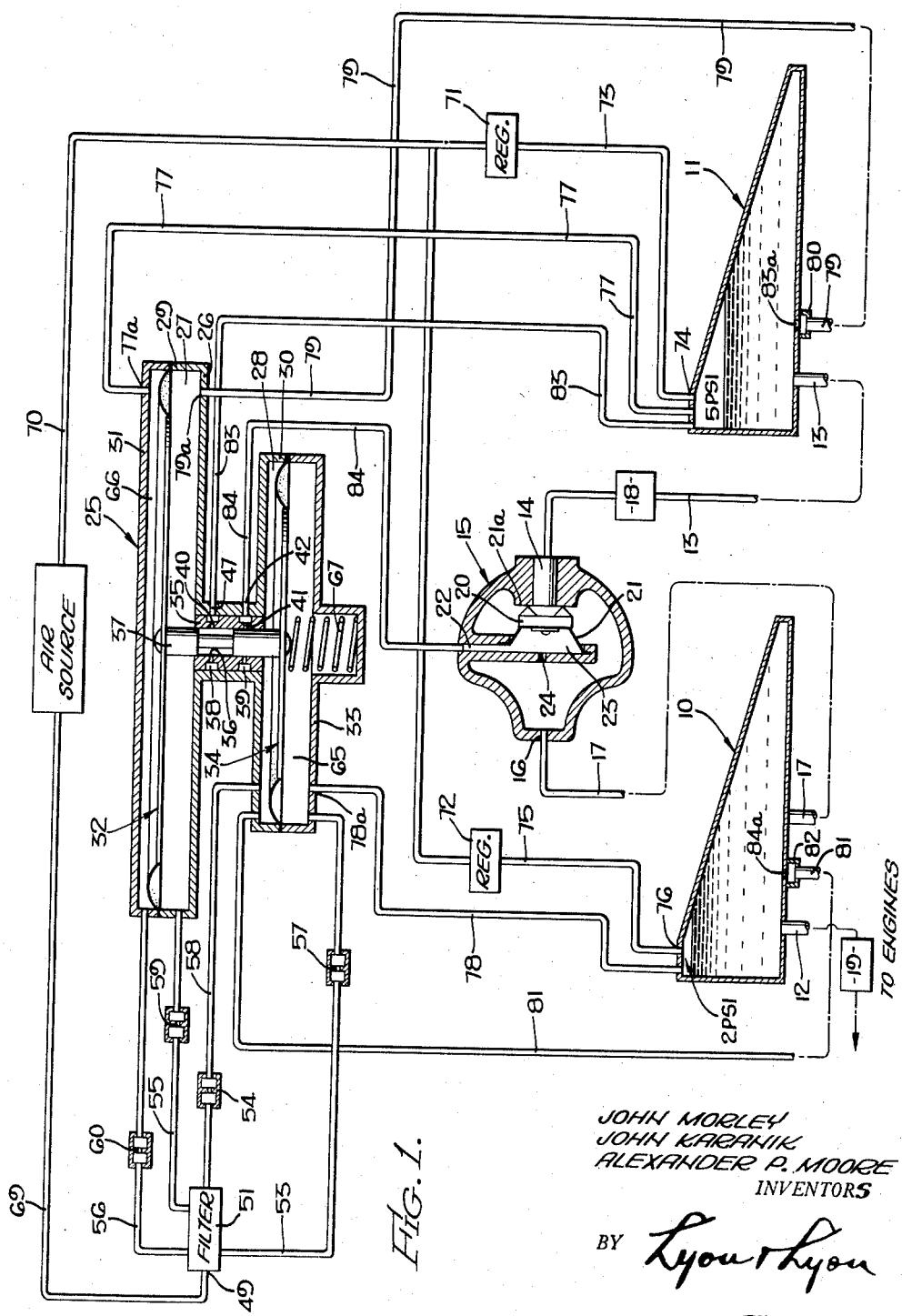
Figure 1 is a schematic diagram showing a preferred embodiment of our invention.
Figure 2:
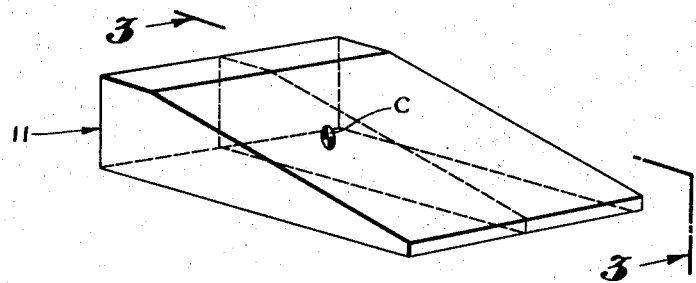
Figure 2 is a diagram showing one of the fuel tanks in idealized form.

Referring to the drawings, the aircraft fuel tanks 10 and 11 are provided with discharge conduits 12 and 13, respectively. Conduit 13 leads from the bottom of tank 11 to the inlet 14 of the modulating valve assembly 15. The outlet 16 of said assembly 15 is connected via pipe 17 to the lower portion of the tank 10, or if desired, the pipe 17 can be connected directly to the discharge conduit 12. The discharge conduit 12 leads to the aircraft engines (not shown). A shut-off valve 18 may be provided in conduit 13 and a similar shut-off valve 19 may be provided in the conduit 12.

The modulating valve assembly 15 includes a movable closure 20 mounted on a flexible diaphragm 21. When fluid pressure is supplied to port 22, the diaphragm moves in a direction to seat the closure 20 against the surface 21a, thereby preventing flow from the inlet 14. When fluid pressure in the port 22 is relaxed, the fluid in the chamber 23 behind the diaphragm 21 is vented through port 24, thereby permitting the closure 20 to move away from the seat surface 21 and permit flow from conduit 13 to pipe 17 through the modulating valve assembly 15.

Differential pressure responsive means are provided for controlling fluid pressure delivered to the modulating valve assembly 15. As shown in Figures 6–9 of the drawings, this means includes a control device 25 having a casing 26. Opposed recesses 27 and 28 formed in the casing are encircled by annular rims 29 and 30 respectively. Clamped to the rim 29 by a cap 31 is a flexible diaphragm assembly 32, and clamped to the rim 30 by a cap 33 is another flexible diaphragm assembly 34.

Mounted by means of a press fit in the central portion of the casing 26 is a bushing 35. This bushing has a bore 36 in which a pilot valve 37 is slidably mounted. The bushing 35 has a pair of axially spaced grooves 38 and 39 connected to the bore 36 by radial holes 40 and 41, respectively. The valve member 37 is connected at one end to diaphragm assembly 32 and at the other end to diaphragm assembly 34. An outlet port 42 (Figure 8) is connected by a passage 43 to the interior of a filter 44 which is mounted in chamber 45, and this chamber 45 is connected to groove 39 by means of a passage 46. Groove 38 is connected to an outlet port 47 (Figure 6) by means of a passage 48.

Another inlet port 49 is connected by a passage 50 to the interior of a filter 51 mounted in a chamber 52. Leading from the filter chamber 52 are passages 53, 54, 55 and 56 (Figure 7) which communicate respectively with restricted orifices 57, 58, 59 and 60 formed in plugs 61, 62, 63 and 64. Orifice 57 communicates with pressure chamber 65 formed between cap 33 and diaphragm 34. Orifice 58 communicates with recess 28 which constitutes a pressure chamber. Orifice 59 communicates with recess 27, which also constitutes a pressure chamber. Orifice 60 communicates with pressure chamber 66 formed between diaphragm 32 and cap 31.

A spring 67 is interposed between the diaphragm 34 and the adjusting screw 68.

The inlet port 49 of the differential pressure device leads to the filter element 51 and is connected to a pipe line 69 supplying air under relatively low pressure, for example, 10 p. s. i. Another pipe line 70 extends from the air source and is connected to pressure regulators 71 and 72. Line 73 leading from pressure regulator 71 connects with the upper portion of tank 10 at 74. Line 75 leading from pressure regulator 72 connects with the upper portion of tank 11 at 76. The regulator 71 delivers air at higher pressure than the regulator 72. For example, the pressure of air in the tank 11 may be 5 p. s. i., while the air pressure in the tank 10 may be 2 p. s. i.

Figure 8:
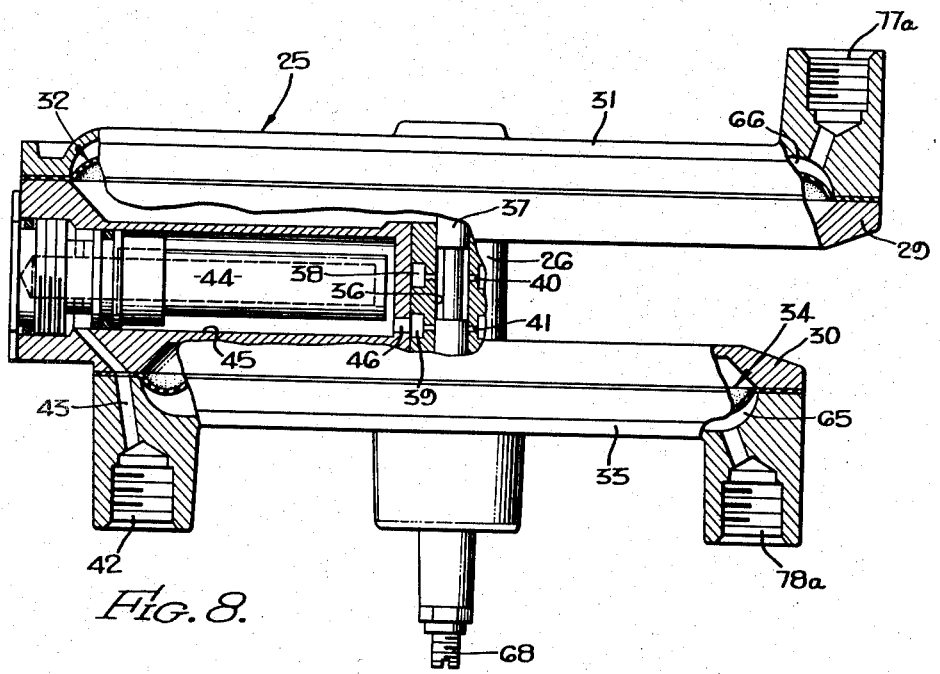
Figure 8 is a partial section view of the control device taken substantially on lines 8—8, as shown on Figure 7.
Figure 9:
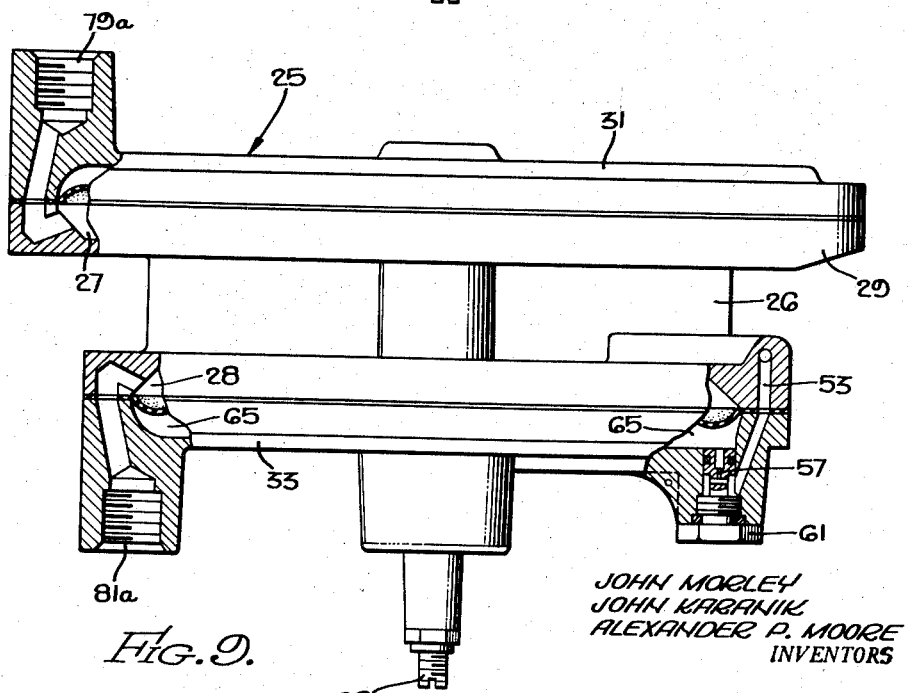
Figure 9 is a partial section view of the control device taken substantially on lines 9—9, as shown on Figure 7.

The upper sensing line 77 connects the upper portion of the tank 11 with the space 66 above the diaphragm 32 via port 77a (Figure 8). Similarly, the upper sensing line 78 connects the upper portion of the tank 10 with the space 65 below the diaphragm 34 via port 78a. The lower sensing line 79 connects the chamber 27 below the diaphragm 32 via port 79a with the terminal fitting 80 on tank 11. Similarly, lower sensing line 81 connects the chamber 28 above the diaphragm 34 via port 81a with the terminal fitting 82 on the tank 10.

The line 83 connects the upper portion of tank 11 with the inlet port 47 of the differential control device 25. The outlet port 42 is connected to the line 84 for operation of the modulating valve assembly 15.

In a typical aircraft fuel system installation, tank 10 may be mounted in the fuselage forward of the center of gravity of the aircraft. Tank 11 may be mounted aft of the center of gravity and may be either higher or lower or at the same height as tank 11 when the aircraft is in its normal level flight attitude. In the accompanying drawings, the tanks are shown at the same height. It will be understood that the tanks 10 and 11 may be mounted at laterally spaced locations in the aircraft, instead of in fore and aft locations as set forth in the embodiment shown in the drawings.

When it is desired that one of the tanks empty at a predetermined fixed ratio with respect to the emptying of the other tank, the diaphragm associated with the low-head tank is constructed with an effective area proportionately larger than the effective area of the diaphragm associated with the high-head tank. If there is to be an additional head difference before the tanks start emptying at the predetermined flow ratio, the spring 67 is additionally provided. Thus, if the hydraulic head in tank 11 is to remain at a fixed percentage of the hydraulic head in tank 10, less a predetermined constant difference, the spring 67 is used to provide the predetermined constant difference, while the diaphragm 34 is proportioned so that its effective area will be the same percentage of the effective area of diaphragm 32 as the desired percentage difference in hydraulic heads, after discounting the predetermined fixed difference.

Figure 3:
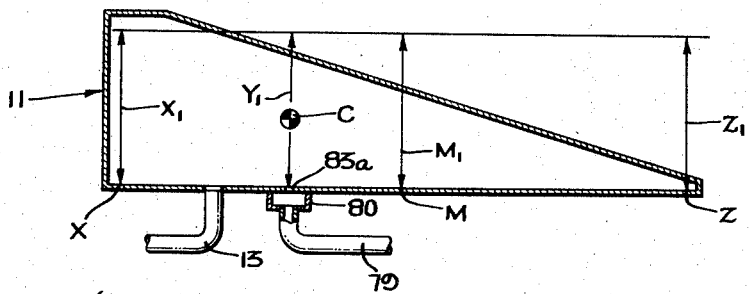
Figure 3 is a diagrammatic section taken substantially on the lines 3—3, as shown in Figure 2.
Figure 4:
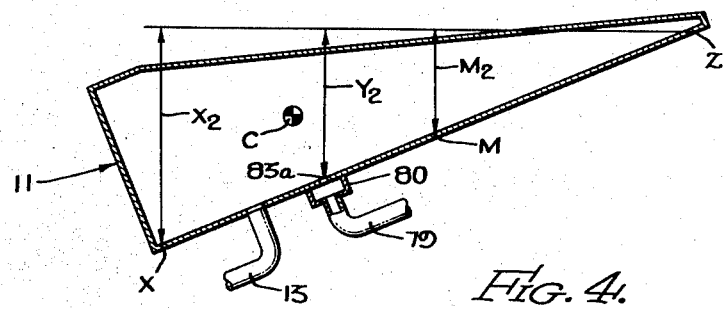
Figure 4 is a view similar to Figure 3 showing the tank in forwardly inclined position.
Figure 5:
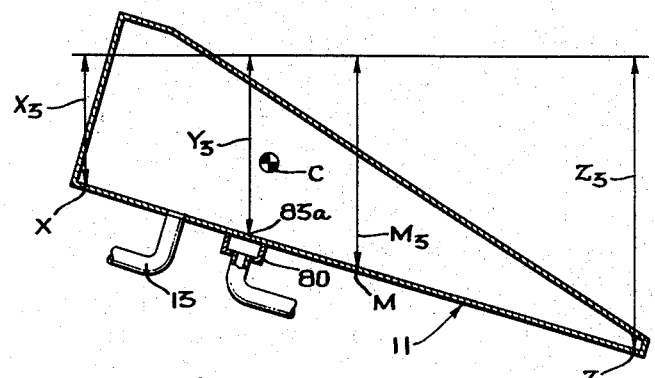
Figure 5 is a view similar to Figure 4 showing the tank in rearwardly inclined position.

The terminal fittings 80 and 82 are connected to the respective tanks 11 and 10 at locations directly below the mean centroid of the fuel mass when the tanks are full. Assuming, for example, that each tank has a cross-section similar to that shown in the drawings, the mean centroid of the fuel mass when each tank is in a level position would be located at points C. Since the sensing connections at terminal fittings 80 and 82 reflect the hydraulic head of fuel within the tanks, the pressure registered at the terminal fitting may be represented by a vector length $Y_1$ when the tank is in the lever attitude, as shown in Figure 3. When the tank is tilted, as shown in Figure 4, as would occur for example when the aircraft descends, the head pressure at the terminal fitting 80 is represented by the vector $Y_2$. Similarly, when the tank is tilted in the opposite direction, as when the aircraft is ascending, the head pressure at terminal fitting 80 is represented by the vector $Y_3$, as shown in Figure 4.

If the lower sensing connection were to be placed at X at the left side of the tank, the vectors become $X_1$, $X_2$ and $X_3$. $X_3$ is considerably shorter than $X_1$, and $X_2$ is considerably longer; therefore, there is a greater variation in the sensed head pressures at X than there is at Y. The variation at Z is still more pronounced. It will be further noted that the variation in vectors $M_2$ and $M_3$ from $M_1$ at the midpoint of the tank bottom is greater than the variation of $Y_2$ from $Y_3$ and $Y_1$.

It is important to have a minimum change in the sensed head pressure as the tanks assume various attitudes. The vectors shown diagrammatically in Figures 1–4 reveal that the minimum variations are obtained when the terminal fittings 80 and 82 of the lower sensing lines 79 and 81 are located directly below the mean centroids of the mass of fuel when the tanks are full.

The restricted orifices 83a and 84a of the terminal fittings 80 and 82, respectively, limit the amount of air flow through the lower sensing lines 79 and 81, respectively. If these restricted orifices were omitted, a greater volume of air would have to be passed through the sensing lines 79 and 81 in order to keep them purged of fuel and this greater air volume would have the disadvantage of placing back pressure on the lines 17 and 13.

It should also be noted that the upper portion of the aft tank 11 is used as a source of air pressure for operating the modulating valve assembly 15 by means of the differential valve 37.

In operation, air is supplied through lines 69 and 70, thereby causing a flow of air through the sensing lines 77, 78, 79 and 81, as well as supplying air at 5 p. s. i. to the upper portion of tank 11 and supplying air at 2 p. s. i. to the upper portion of tank 10 Shut-off valves 18 and 19 are then opened. The 2 p. s. i. pressure in tank 10 forces fuel from that tank into delivery conduit 12 and the 5 p. s. i pressure in tank 11 forces the fuel into conduit 13, through modulating valve assembly 15, through conduit 17 and into conduit 12. The air pressure in tank 11 is maintained at a higher value than tank 10 in order to prevent back flow of fuel from tank 10 into tank 11.

As fuel is being delivered to the engines through conduit 12, air under pressure from line 69 passes through the filter 51 into the branch passages 53, 54, 55 and 56. From these passages the air passes through restricted orifices 57, 58, 59 and 60 into pressure chambers 65, 28, 27 and 66, respectively. The restricted orifices greatly reduce the rate of flow of air into these pressure chambers, so that the pressure in these pressure chambers will be only slightly higher than the pressures in the lines 78, 81, 79 and 77. The slight amount by which the pressures in the chambers 65, 28, 27 and 66 exceed the pressures in sensing lines 78, 81, 79 and 77, respectively, at the vicinity of the connection of the sensing lines to the tanks, is equal to the pressure drop in the sensing lines as the air slowly passes therethrough toward the tanks 10 and 11.

Assuming that the pressure drop in each of said sensing lines is equal to 0.1 p. s. i., it is apparent that the pressure in chamber 66 will be equal to 5.1 p. s i and that the pressure in chamber 27 will be equal to 5.1 p. s. i. plus the pressure head of the fuel in tank 10. For purposes of illustration, this pressure head may be assumed to be 0.9 p. s. i. at a given stage in the emptying of the tanks. Thus, at that time, the total air pressure in chamber 27 would be 6.0 p. s. i. At the same time, the air pressure in chamber 65 is 2.1 p. s. i. and the pressure in chamber 28 is 2.1 p. s. i. plus that amount due to the pressure head in tank 11. Assuming that this pressure head is to be 75% of the pressure head in tank 10 after deducting a predetermined constant difference and assumed to be equivalent to a head pressure of 0.1 p. s. i., the pressure head in tank 11 then becomes 1.3 p. s. i. This added to 2.1 p. s. i. air pressure totals 3.4 p. s. i. air pressure existing in chamber 28.

In chamber 65 there is 2.1 p. s. i. air pressure plus the action of the spring 67. Since the spring serves to provide the head difference between the tanks, it acts on diaphragm 34 with a force the equivalent of a 2.2 p. s. i. force acting upwardly on diaphragm 34.

The difference of 5.1 p. s. i. and 6.0 p. s. i. acting on opposite sides of diaphragm 32 yields a net over-balance of 0.9 p. s. i. acting on diaphragm 32 in the upward direction. If diaphragm 32 has an effective area of 10 square inches, this yields a total upward force of 9 pounds. Meanwhile, the 3.4 p. s. i. and the force equivalent to 2.2 p. s. i. acting on opposite sides of diaphragm 34 result in an unbalanced force of 1.2 p. s. i. acting downwardly on diaphragm 34. To maintain an equilibrium position for the two diaphragms and the valve 37, the effective area of the diaphragm 34 must be such that when it is multiplied by 1.2 p. s. i. a like force of 9 pounds is obtained. This effective area thus becomes 7.5 square inches, which is 75% of the area of diaphragm 32. In this position of equilibrium, the valve 37 is so positioned that it just slightly uncovers groove 39 to allow a small amount of air to flow from inlet passage 83 through the outlet port 42 and line 84 to the modulating valve assembly 15 through port 22. Air escapes from the pressure chamber 23 through the restricted opening 24, but the inflow and outflow from chamber 72 balance and maintain the closure 20 at the proper position to permit the desired rate of flow of fuel from tank 11 through the modulating valve assembly 15 into the conduit 17.

In the event more fuel has emptied from tank 11 than from tank 10 than provided for in accordance with the above illustrated predetermined relationship, the pressure due to hydraulic head in tank 11 will be correspondingly less and the pressure within chamber 27 will be lower than that required to keep the diaphragm 32 in the equilibrium position. As a result, the pressure in chamber 27 will not overbalance the pressure in chamber 66 as much as the pressure in chamber 28 overbalances that in chamber 65, with the net effect that both diaphragms will move downwardly and cause the valve 37 to more fully open groove 39. A greater amount of air will then pass through line 84 to the modulating valve assembly 15. This causes the valve to close and thus shut off further flow of fuel from tank 11 until such time as the pressure head in tank 10 has decreased by the proper amount to be in the desired proportion to the pressure head in tank 11. At that time, the modulating valve will re-open.

In the event more fuel has emptied from tank 10 than the amount required under the predetermined relationship, the pressure in chamber 28 has decreased below that required to keep the diaphragms in an equilibrium position and hence the diaphragms and the valve 37 move upwardly. This causes the valve 37 to close off the groove 39 and interrupt the flow of air through the line 84 to the modulating valve assembly 15. The valve then opens more fully to allow a greater rate of flow of fuel from the tank 11. This continues until the fuel level in tank 11 has decreased sufficiently to restore the predetermined relationship between the pressure heads in the two tanks.

It will be noted that for each tank the sensing lines connecting the bottom and top of the tank to the respective pressure chambers in the differential pressure control device 25 transmit to the diaphragms the actual fluid pressures existing at the top and bottom of the respective tank. Thus, in tank 11 the fluid pressure at the top of the tank is 5 p. s. i. The fluid pressure at the bottom of the tank is equal to the fluid hydraulic head pressure of the liquid fuel plus the 5 p. s. i. air pressure. Thus, the 5 p. s. i., due to the air pressure, is reflected through lines 79 and 77 to both sides of the diaphragm 32 and, consequently, the net effect on the diaphragm is zero. The only effective pressure on diaphragm 32 is that due to the hydraulic liquid head in tank 11.

In like manner, the 2 p. s. i. air pressure in tank 10 acts on both sides of diaphragm 34 and cancels out, so that the only fluid pressure effective on this diaphragm is that due to the hydraulic liquid head of fuel in tank 10.

Since the only effective fluid pressure acting on the diaphragms 32 and 34 is caused by actual hydraulic heads of liquid fuel in the respective tanks, the relative height of one tank with respect to the other is immaterial. Thus, either tank may be initially installed higher than the other. Likewise, the relative height may vary due to changes in attitude of the aircraft without affecting control of the pressure head relationships.

Having fully described our invention, it is to be understood that we do not wish to be limited to the details herein set forth, but our invention is of the full scope of the appended claims.

We claim:

1. In a device for controlling the relative rate of discharge of liquid from two tanks to a common discharge conduit and wherein one of the tanks discharges through a modulating valve, the improvement comprising, in combination: a differential pressure control device including a pair of movable members each having opposed pressure receiving areas, means including sensing lines for applying pressures to the opposed areas of one of said members to reflect pressures in the top and bottom, respectively, of one of said tanks, means including sensing lines for applying pressures to the opposed areas of the other of said members to reflect pressures in the top and bottom, respectively, of the other of said tanks, respectively, means for causing pneumatic flow through each of the sensing lines in a direction into the tanks, means forming a restriction at the point where each lower sensing line enters the lower portion of its respective tank, said restriction being located at a position directly below the mean centroid of the liquid mass when the tank is filled and in normal position, and means whereby said control device may actuate the modulating valve.

2. In a device for controlling the relative rate of discharge of liquid from two tanks to a common discharge conduit and wherein one of the tanks discharges through a modulating valve, the improvement comprising, in combination: a differential pressure control device including a pair of mechanically interconnected movable members each having opposed pressure receiving areas, the pressure receiving areas on one member being larger than those of the other member, means including sensing lines for applying pressures to the opposed areas of one of said members to reflect pressures in the top and bottom, respectively, of one of said tanks, means including sensing lines for applying pressures to the opposed areas of the other of said members to reflect pressures in the top and bottom, respectively, of the other of said tanks, means for causing pneumatic flow through each of the sensing lines in a direction into the tanks, means forming a restriction at the point where each lower sensing line enters the lower portion of its respective tank, said restrictions being located at a position directly below the mean centroid of the liquid mass when the tank is filled and in normal position, and means whereby movement of said members is made effective to operate the modulating valve.

3. In a device for controlling the relative rate of discharge of liquid from two tanks to a common discharge conduit and wherein one of the tanks discharges through a modulating valve, the improvement comprising, in combination: a differential pressure control device adapted to actuate a pilot valve, said control device including a pair of movable members connected to operate the pilot valve and each having opposed pressure receiving areas, means including sensing lines for applying pressures to the opposed areas of one of said members to reflect pressures in the top and bottom, respectively, of one of said tanks, means including sensing lines for applying pressures to the opposed areas of the other of said members to reflect pressures in the top and bottom, respectively, of the other of said tanks, means for causing pneumatic flow through each of the sensing lines in a direction into the tanks, means forming a restriction at the point where each lower sensing line enters the lower portion of its respective tank, said restriction being located at a position directly below the mean centroid of the liquid mass when the tank is filled and in normal position, means supplying a fluid to the pilot valve, and fluid-operated means whereby the pilot valve may operate the modulating valve.

4. In a device for controlling the relative rate of discharge of liquid from first and second tanks to a common discharge conduit and wherein the second tank discharges through a modulating valve, the improvement comprising, in combination: a differential pressure control device adapted to actuate a pilot valve, said control device including a pair of movable members connected to operate the pilot valve and each having opposed pressure receiving areas, means including sensing lines for applying pressures to the opposed areas of one of said members to reflect pressures in the top and bottom, respectively, of the first said tank, means including sensing lines for applying pressures to the opposed areas of the other of said members to reflect pressures in the top and bottom, respectively, of the second said tank, means for causing pneumatic flow into the upper portion of the second tank, means forming a restriction at the point where each lower sensing line enters the lower portion of its respective tank, said restriction being located at a position directly below the mean centroid of the liquid mass when the tank is filled and in normal position, conduit means connecting the upper portion of the second tank to the pilot valve, and pneumatic means whereby the pilot valve may operate the modulating valve.

References Cited in the file of this patent
UNITED STATES PATENTS 2,726,671     Zand et al. _____ Dec. 13, 1955